(12) United States Patent
Lai et al.

(10) Patent No.: US 8,780,467 B2
(45) Date of Patent: Jul. 15, 2014

(54) LENS ASSEMBLY

(75) Inventors: Tu-Fa Lai, Taoyuan Hsien (TW); Yung-Hsuan Hsu, Taoyuan Hsien (TW)

(73) Assignees: Preoptix (Jiangsu) Co. Ltd., Zhenjiang (CN); Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 13/344,625

(22) Filed: Jan. 6, 2012

(65) Prior Publication Data

US 2012/0212843 A1 Aug. 23, 2012

(30) Foreign Application Priority Data

Feb. 17, 2011 (CN) .................... 2011 2 0052423 U

(51) Int. Cl.
*G02B 7/02* (2006.01)
*G02B 13/00* (2006.01)

(52) U.S. Cl.
CPC .............. *G02B 13/001* (2013.01); *G02B 7/022* (2013.01); *G02B 7/025* (2013.01)
USPC .......................................... 359/819; 359/811

(58) Field of Classification Search
USPC .......................................... 359/811, 815, 819
See application file for complete search history.

(56) References Cited

U.S. PATENT DOCUMENTS

| 5,781,351 | A | * | 7/1998 | Murakami et al. | ............ 359/808 |
| 7,061,699 | B2 | | 6/2006 | Watanabe et al. | |
| 7,286,448 | B2 | * | 10/2007 | Suzuki et al. | ............ 369/44.14 |
| 2007/0076309 | A1 | * | 4/2007 | Shimizu et al. | ............ 359/811 |

FOREIGN PATENT DOCUMENTS

| JP | 61032017 A * 2/1986 |
| TW | 557059 10/2003 |

OTHER PUBLICATIONS

Office Action from related Taiwanese Appln. No. 100110490 dated Jan. 7, 2014. English translation attached.

\* cited by examiner

*Primary Examiner* — Mahidere Sahle
(74) *Attorney, Agent, or Firm* — Grossman, Tucker, Perreault & Pfleger, PLLC

(57) ABSTRACT

A lens assembly is provided. The lens assembly comprises a lens and a bearing seat. The bearing seat has a bearing surface for bearing the lens, while the bearing surface is adapted to adhere to the lens so that the lens is fixed on the bearing seat.

6 Claims, 5 Drawing Sheets

LENS ASSEMBLY

This application claims priority to Chinese Patent Application No. 201120052423.X filed on Feb. 17, 2011.

CROSS-REFERENCES TO RELATED APPLICATIONS

Not applicable.

BACKGROUND OF THE INVENTION

1. Field of the Invention

The present invention relates to a lens assembly, and more particularly, to a lens assembly in which a lens is fixed via adhesion.

2. Descriptions of the Related Art

With the continuous advancement of optical technologies, corresponding electronic products such as projection apparatuses and digital cameras have found wide application in people's daily life in recent years. To fulfill users' demands for good portability and high pixel performance and imaging quality of these electronic products, the development of miniaturized photographic lenses and projection lenses becomes more and more important.

FIG. 1 illustrates a schematic cross-sectional view of a lens assembly of the prior art 1. The lens assembly 1 comprises a first lens 11, a second lens 12, a third lens 13, a frame 14 and a circular fixing element 15. The frame 14 is adapted to define a receiving portion 141 for receiving the third lens 13, the second lens 12 and the first lens 11 therein in sequence. Then, by having the circular fixing element 15 disposed on the first lens 11 and further fastened to the frame 14, the first lens 11, the second lens 12 and the third lens 13 are fixed into the frame 14. However, in the lens assembly of the prior art 1, the method in which the lenses are fixed are disadvantageous for the following two reasons. First, when the first lens 1 has a large outer diameter and a large curvature, the frame 14 must be made to have a large outer diameter, and the circular fixing element 15 and the frame 14 must be further made to have a large wall thickness to enhance the strength of fixing the first lens 11; consequently, this leads to an increased volume of the lens assembly 1. Second, when the circular fixing element 15 is further fastened to the frame 14 by means of the periphery of the first lens 11, the first lens 11 will receive both a pressure applied by the circular fixing element 15 and a reaction force applied by the frame 14 when the first lens 11 is pressed against the frame 14, which tends to cause flexure or deformation of the first lens 11 due to an overdue stress.

In view of this, an urgent need exists in the art to provide a lens assembly with a small volume that is capable of appropriately fixing a lens without deformation.

SUMMARY OF THE INVENTION

An objective of the present invention is to provide a lens assembly capable of solving the aforesaid problem of the lens assembly of the prior art being too bulky in volume and causing deformation of the lens due to improper fixation.

To achieve the aforesaid objective, the lens assembly of the present invention comprises a lens and a bearing seat. The bearing seat has a bearing surface for bearing the first lens. The bearing surface adheres to the lens by means of adhesive layers. Thereby, the bearing seat can be made to have a small volume while still being able to fix the lens properly, while simplifying the structure of the lens assembly.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
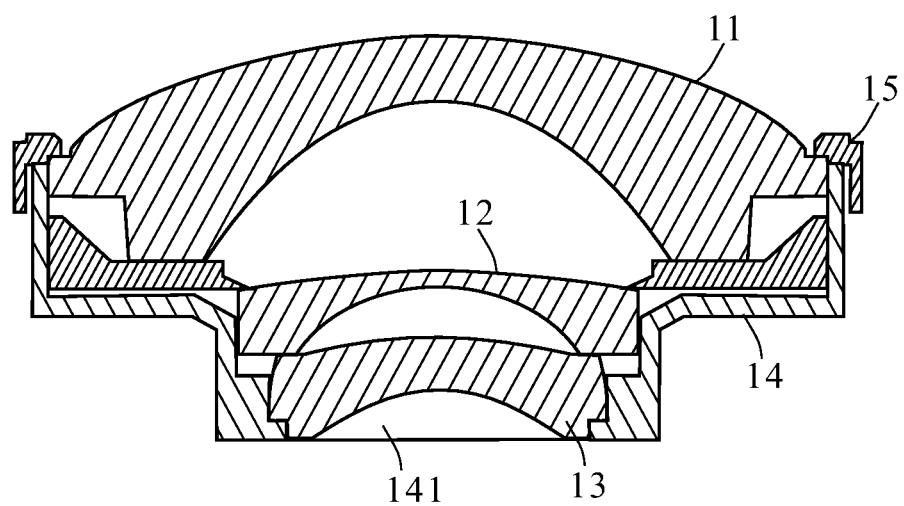
FIG. 1 is a schematic cross-sectional view of a lens assembly of the prior art according to the present invention.
Figure 2A:
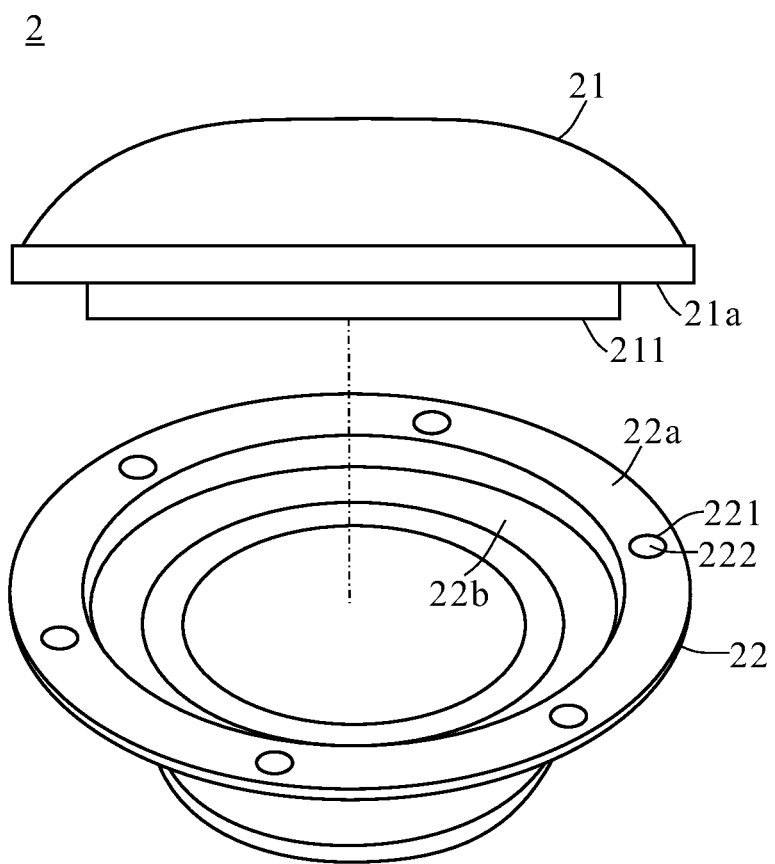
FIG. 2A is a schematic exploded view of a lens assembly according to a first preferred embodiment of the present invention.
Figure 2B:
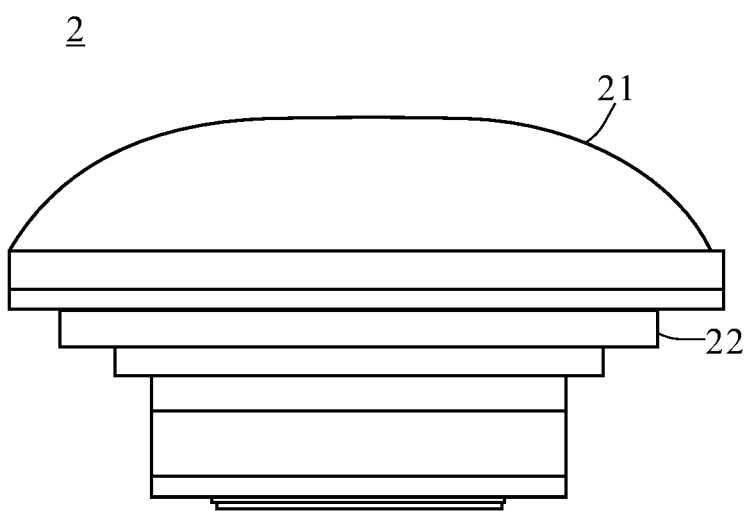
FIG. 2B is a schematic assembly view of the lens assembly according to the first preferred embodiment of the present invention.

FIGS. 2A and 2B show a lens assembly 2 according to the first preferred embodiment of the present invention. FIG. 2 is an exploded view of the lens assembly 2, while FIG. 2B is a schematic assembly view of the lens assembly 2. It should be appreciated that in these attached drawings, elements unrelated to the present invention are omitted from depiction; the shapes of and dimensional relationships among the individual elements in these attached drawings are illustrated only for the ease of understanding, but not to limit the actual structure and scale.

The lens assembly 2 of the first preferred embodiment of the present invention may be applied to fixed-focus lenses of electronic products such as projection apparatuses or digital cameras. The lens assembly 2 comprises a first lens 21 and a bearing seat 22. The bearing seat 22 has a first bearing surface 22a for bearing the first lens 21. The first lens 21 is adapted to be fixed onto the bearing seat 22 through adhesion to the first bearing surface 22a.

In detail, as shown in FIG. 2A, the bearing seat 22 has a plurality of recessions 221 formed at intervals on the first bearing surface 22a. During assembly, an adhesive may be filled into the recessions 221 from above the bearing seat 22 to form a plurality of adhesive layers 222. In other words, the adhesive layers 222 are received in each of the recessions 221 respectively. In this way, a periphery edge of a bottom 21a of the first lens 21 is adhered to the first bearing surface 22a by the adhesive layers 222 received in the recessions 221.

In this embodiment, the first lens 21 has a protrusion 211 in a circular form and is disposed on the bottom 21a of the first lens 21. The bearing seat 22 has a second bearing surface 22b disposed adjacent to the first bearing surface 22a to bear the protrusion 211. Thus, an area in which the bearing seat 22 bears the first lens 21 (i.e., an area in which the first lens 21 is held by the bearing seat 22) can be increased. This, in combination with the protrusion 211, allows the first lens 21 to be securely held on the bearing seat 22 to prevent the displacement of the first lens 21 when being impacted by an external force before the adhesive layers 222 are cured.

Figure 3A:
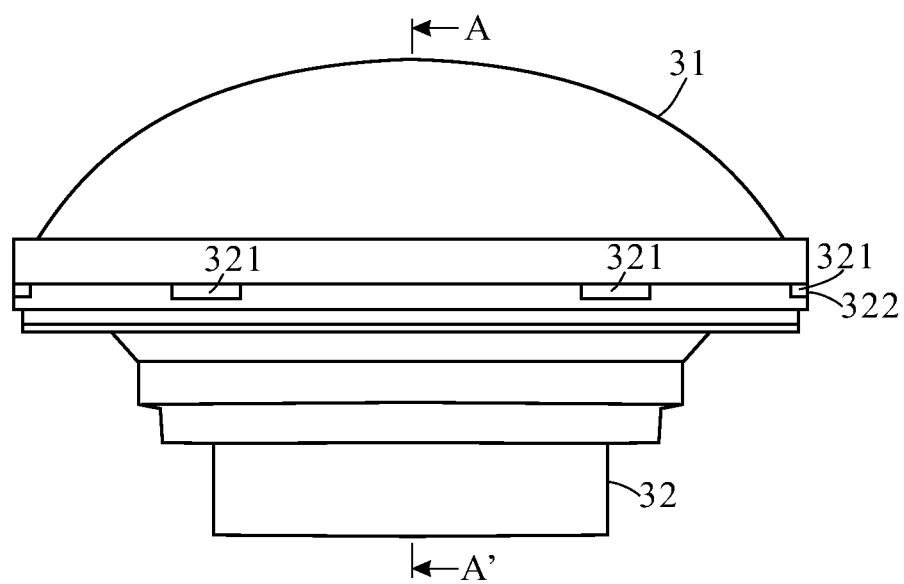
FIG. 3A is a schematic assembly view of a lens assembly according to a second preferred embodiment of the present invention.
Figure 3B:
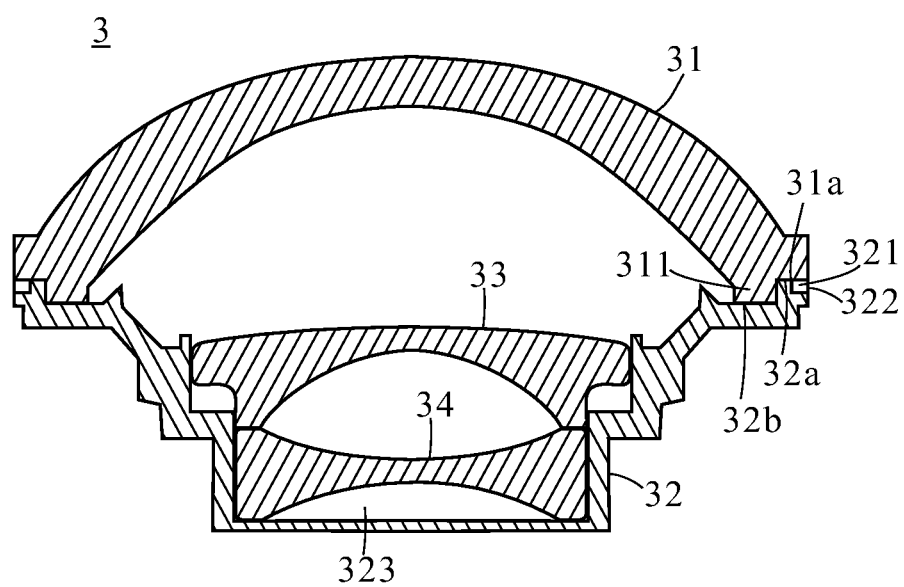
FIG. 3B is a schematic cross-sectional view of FIG. 3A taken along a line A-A'.

FIGS. 3A and 3B show a lens assembly 3 according to a second preferred embodiment of the present invention. FIG. 3A is a schematic assembly view of the lens assembly 3, while FIG. 3B is a schematic cross-sectional view of the lens assembly 3 taken along a line A-A'. It should be appreciated that elements unrelated to the present invention are omitted from depiction in these attached drawings; and the shapes of and dimensional relationships among the individual elements in these attached drawings are illustrated only for the ease of understanding, but not to limit the actual structure and scale.

Similar to the first preferred embodiment, the lens assembly 3 of this embodiment comprises a first lens 31 and a bearing seat 32. The bearing seat 32 has a first bearing surface 32a for bearing the first lens 31. The first lens 31 is adapted to be fixed onto the bearing seat 32 via adhesion to the first bearing surface 32a. However, this embodiment differs from the first preferred embodiment in that the lens assembly 3 further comprises a second lens 33 and a third lens 34; and as shown in FIG. 3B, the bearing seat 32 further defines a receiving space 323 for receiving the second lens 33 and the third lens 34 therein. Thereby, the lens assembly of this embodiment can be applied to zoom lenses of electronic products such as projection apparatuses or digital cameras.

This embodiment further differs from the first preferred embodiment of the present invention in that as shown in FIG. 3B, the bearing seat 32 has a plurality of recessions 321 formed at intervals on an edge of the first bearing surface 32a. In other words, each of the recessions 321 is formed as a broken recession. When the lens assembly 3 is to be assembled, the second lens 33 and the third lens 34 are received into the receiving space 323 first, then the first lens 31 is placed on the bearing seat 32, and finally, an adhesive is filled into the recessions 321 from a side of the bearing seat 32 to form a plurality of adhesive layers 322. Likewise, the adhesive layers 322 are received in each of the recessions 321 respectively. In this way, a periphery edge of a bottom 31a of the first lens 31 is adhered to the first bearing surface 32a by the adhesive layers 322 received in the recessions 321.

In this embodiment, the first lens 31 also has a protrusion 311 in a circular form and is disposed on a bottom 31a of the first lens 31. The bearing seat 32 has a second bearing surface 32b disposed adjacent to the first bearing surface 32a to bear the protrusion 311. Thus, an area in which the bearing seat 32 bears the first lens 31 (i.e., an area in which the first lens 31 is held by the bearing seat 32) can be increased. This, in combination with the protrusion 311, allows the first lens 31 to be securely held on the bearing seat 32 to prevent displacement of the first lens 31 when being impacted by an external force before the adhesive layers 322 are cured.

Additionally, the lens assembly 3 of this embodiment may comprise at least one spacer (not shown) disposed between the protrusion 311 and the second bearing surface 32b to further adjust a distance between the first lens 31 and the second lens 33; this may be readily appreciated by those skilled in the art, so no further description will be made herein. The second lens 33 and the third lens 34 may be fixed in the receiving space 323 through snap-fitting, adhesion or the like.

According to the above descriptions, as compared to the prior art lens assemblies where the lenses are all received in the frames, the first lens of the lens assembly of the present invention can be directly held on and adhered to the bearing seat. As a result, use of unnecessary parts such as the conventional circular fixing elements can be eliminated to simplify the structure of the lens assembly and to significantly reduce the outer diameter of the bearing seat, and the flexure and deformation of the lens due to an overdue stress can be avoided. Thereby, electronic products such as projection apparatuses or digital cameras adopting the lens assembly of the present invention can be made to have a small volume and high imaging quality, and can be manufactured through a simplified process at a lower cost. The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A lens assembly comprising:
a first lens having a bottom periphery edge and a protrusion in a circular form disposed on a bottom of the first lens;
a bearing seat having a first bearing surface contacting the bottom periphery edge of the first lens and a plurality of recessions formed at intervals on the first bearing surface, wherein a portion of the first bearing surface is located between the recessions and the protrusion and the first bearing surface is higher than the recessions and the protrusion; and
a plurality of adhesive layers received in each of the recessions respectively so that the bottom periphery edge of the first lens is adapted to adhere to the first bearing surface by the adhesive layers.

2. The lens assembly as claimed in claim 1, wherein each of the recessions is a broken recession formed on an edge of the first bearing surface.

3. The lens assembly as claimed in claim 1, wherein the bearing seat has a second bearing surface disposed adjacent to the first bearing surface to bear the protrusion.

4. The lens assembly as claimed in claim 3, comprising at least one spacer disposed between the protrusion and the second bearing surface.

5. The lens assembly as claimed in claim 4, wherein the bearing seat is adapted to define a receiving space to receive a second lens and a third lens of the lens assembly.

6. The lens assembly as claimed in claim 5, wherein the lens assembly is applied to a projection device.

* * * * *